Figure 3:
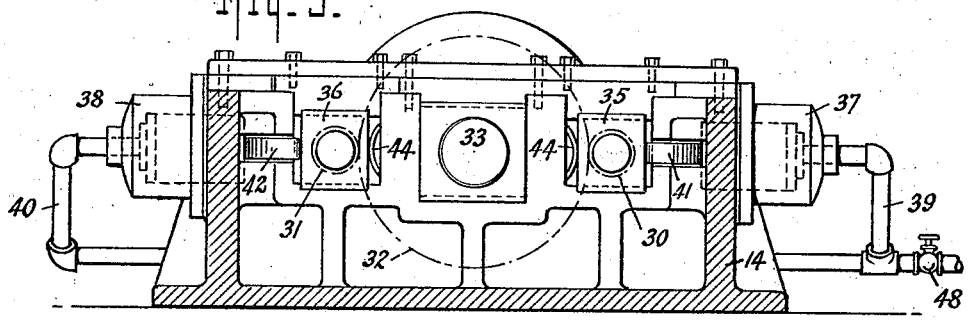

H. H. SUPLEE.
TRANSMISSION AND SPEED CONVERSION MECHANISM.
APPLICATION FILED FEB. 21, 1919.

1,415,128.

Patented May 9, 1922.

2 SHEETS—SHEET 1.

WITNESSES
INVENTOR
Henry Harrison Suplee
BY
ATTORNEYS

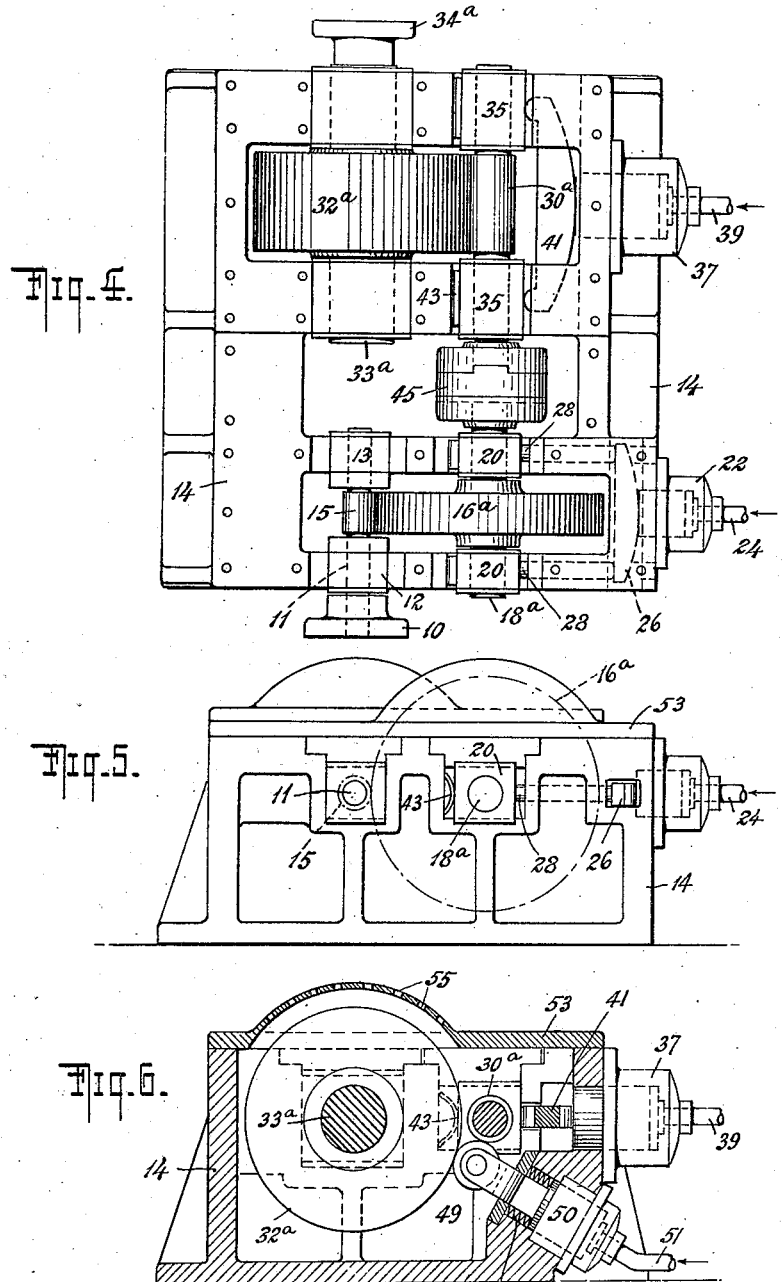

UNITED STATES PATENT OFFICE.

HENRY HARRISON SUPLEE, OF NEW YORK, N. Y.

TRANSMISSION AND SPEED-CONVERSION MECHANISM.

1,415,128.    Specification of Letters Patent.    Patented May 9, 1922.

Application filed February 21, 1919. Serial No. 278,348.

*To all whom it may concern:*

Be it known that I, HENRY HARRISON SUPLEE, a citizen of the United States, residing in the city, county, and State of New York, have invented certain new and useful Improvements in Transmission and Speed-Conversion Mechanism, of which the following is a specification.

My invention relates to the transmission and speed-conversion of power from one rotating shaft to another; changing the number of revolutions to a predetermined greater or less number, and relates more particularly to the reduction in rotative speed of the power of a steam or other fluid-pressure turbine, from the high rotative speed which is most efficient for such a prime mover to the slower speed which is more efficient for, for instance, a marine or aerial propeller.

It is well known that such speed reduction may be made by the use of various arrangements of toothed gearing, but in practice it is found that under the high rotative speeds developed by steam, gas, and similar fluid turbines, and with the large powers required for ship propulsion, such toothed gearing develops rapid wear and short life, notwithstandng the various devices which have been produced for providing elasticity, adjustability, and lubrication of the wearing parts. It is known by those familiar with the construction and operation of such toothed-gear speed-reduction devices that under the most favorable conditions the life of such transmission mechanism does not exceed 75,000 to 100,000 miles, and that this represents only 12 to 15 round trips across the North Atlantic Ocean between New York and Liverpool, or little more than a year's service; while the remainder of the power plant on the same vessel has a probable life of 15 to 20 years.

My invention relates to such improvements in the arrangement and construction of smooth rolling friction wheels as will enable rolling friction to be used instead of toothed gearing for the purpose of power transmission and speed-conversion, even with the high rotative speeds and large powers involved in marine propulsion.

Heretofore the usual arrangement of rolling friction wheels for power transmission and speed-conversion has involved the use of pairs of wheels of different materials, one being usually made of cast-iron and the other of some softer fibrous material, such as leather, straw-board, paper, wood or the like. Wheels of this sort have been found effective for moderate powers but since the magnitude of the power transmitted depends upon the pressure with which the wheels are held in contact, the coefficient of friction remaining sensibly constant, the limit of capacity appears in the crushing pressure which the softer wheel is capable of resisting before failure and breakdown.

In order that the maximum capacity of rolling friction drive be attained it is essential that the wheels be capable of sustaining high pressures at the surface of contact and that means should be devised for maintaining and equalizing such pressures.

Ordinary friction drives, using pairs of wheels, of which one was made of fibrous material, should not be operated at pressures of more than 240 pounds per inch of contact width, and such wheels fail at pressures not exceeding 1,200 pounds per inch of width. (See paper of Prof. W. F. M. Goss, Trans. Am. Soc. Mechanical Engineers, Vol. 29, pp. 1003–1113. This paper is the only definite test report known, and is the basis of all modern text book references on the subject).

When, however, the contact surfaces are both made of steel or other hard resistant material, it is practicable to operate friction driving at pressures exceeding 10,000 pounds per inch of contact width, and such pressures are in daily operation under the driving wheels of thousands of steam locomotives.

An analysis of the tests of various locomotives, made by the Pennsylvania Railroad Company at the St. Louis Exposition in 1904, shows that in railway service upwards of 30 horse power is readily transmitted per inch of width of driving wheel per 1,000 feet lineal speed, and that such power transmissions are regularly made at speeds of 6,000 to 9,000 feet per minute on powers of 1200 to 1500 horse power.

My invention comprises such arrangement of parts as will provide for the maintenance and control of such pressures as 10,000 pounds per inch of width of contact face on rolling friction wheels of steel or similar hard material, at speeds of 5,000 to 10,000 feet per minute, in connection with fluid-pressure turbines or similar high-speed motors, running at rotative speeds of 3,500 to 4,000 revolutions per minute, reducing the speed to propeller shafts running 90 to 150 revolutions per minute in regular service.

Figure 1:
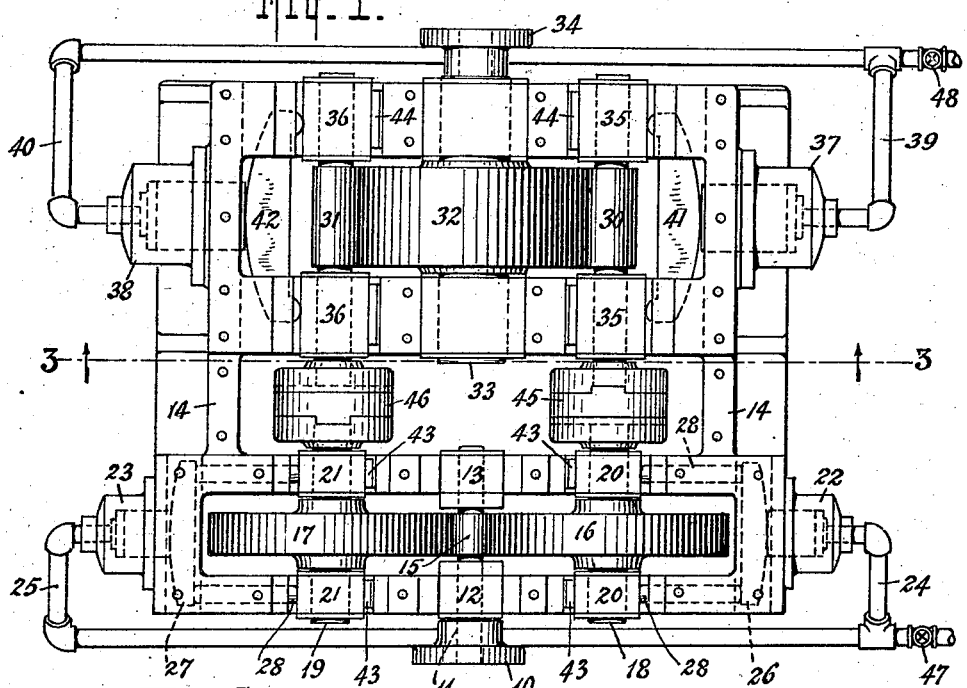
Figure 2:
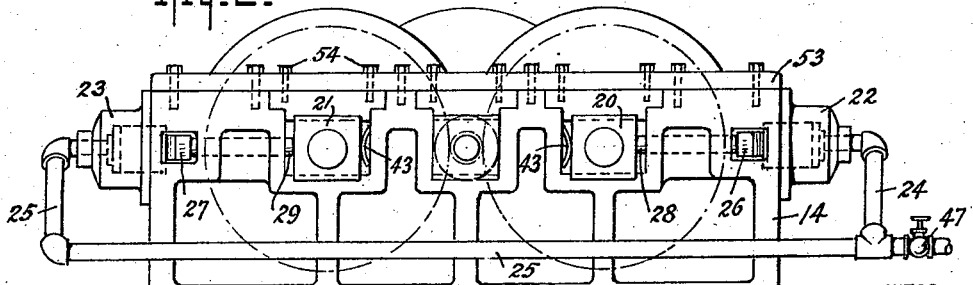

My invention will be more perfectly understood by reference to the enclosed drawings which are more or less diagrammatic, and in which Fig. 1, represents a plan view of a general transmission system designed in accordance with my invention; Fig. 2 is an end view of the power-intake end; Fig. 3 is a cross section on the line 3—3 of Fig. 1; Figs. 4 and 5 are plan and end views respectively of another form of my invention, and Fig. 6 is a sectional view illustrating a reversal arrangement which may be included in my system.

Referring to Fig. 1, 10 is the coupling which is connected to the source of power, as, for example, the rapidly revolving shaft of a fluid-pressure turbine. This coupling 10 is located on the end of a short shaft 11, mounted in boxes or bearings 12 and 13 carried by suitable portions of a supporting frame 14; the shaft 11 carries a smooth, cylindrical friction wheel 15. At 16 and 17 are larger smooth friction wheels, which may be pressed into contact with the smaller friction wheel or pinion 15, these friction wheels 16 and 17 being carried on shafts 18—19, running in boxes 20—21. These boxes 20—21 are mounted on the general housing or frame 14 of the apparatus so that they are capable of slight movement to or from the central shaft 11, thus rendering it possible for pressure to be applied to force the friction wheels 16—17 against the pinion 15.

At 22 and 23 are pressure cylinders communicating by means of pipes 24—25 with an accumulator or other source of fluid pressure, not shown. The rams of these pressure cylinders impinge upon equalizing levers 26—27, which bear upon rods or bars 28—29, and these bars bear upon the journal boxes 20—21. By this means pressure from the cylinders 22—23 acts to press the friction wheels 16—17 against the pinion 15. By making the cylinders 22—23 of equal area, and connecting them to the same source of fluid pressure, the wheels 16—17 are forced against the pinion 15 with equal force upon opposite sides, these pressures thus balancing each other.

The shafts 18—19, upon which the friction wheels 16—17 are carried, extend across the frame or housing 14 of the apparatus, and carry also roller friction wheels or pinions 30—31 which are placed so as to be capable of being pressed against the roller friction wheel 32, mounted on a shaft 33, carrying a coupling 34, permitting the converted-speed rotary motion to be carried through a tail shaft to the propeller or other point where the power is to be utilized.

The portions of the shafts 18—19 carrying the pinions 30—31 are mounted in boxes 35—36, which are capable of movement to or from the central shaft 33. At 37—38 are pressure cylinders communicating by means of pipes 39—40 with a suitable source of fluid-pressure; the rams of said cylinders act upon equalizing levers 41—42, transmitting the equalized pressure to the boxes 35—36 and holding the roller friction pinions 30—31 against the friction wheel 32.

Behind the boxes 20—21 are springs 43, and behind the boxes 35—36 are springs 44, these springs, which may be plate, helical, or of other suitable types, acting to force the rolling friction wheels out of contact when the fluid-pressure on the cylinders 22—23, 37—38 is relieved.

At 45 and 46 are adjustable or flexible couplings, of the well known Oldham or other suitable type, permitting the separate portions of the shafts 18—19 to have a slight independent movement transverse to their axes, thus enabling the pressure upon the wheels and pinions to hold them in contact or permit their release without causing unequal contact or unequal pressure on the bearings.

The pipes 24—25—39—40 through which the fluid-pressure is delivered to the pressure cylinders 22—23 and 37—38 respectively, are provided with suitable valves 47 and 48, by means of which the pressure may be turned on or off, or throttled or controlled. By this means the friction wheels may all be kept out of contact until it is desired to put the pressure upon them.

Assuming the parts to be in normal position in which the rams of the cylinders 22—23 and 37 and 38 are free from pressure, so that the friction wheels 16 and 17 engage the friction pinion 15 without pressure and the friction pinions 30 and 31 similarly bear lightly against the friction wheel 32, the operation is as follows:

The power generating element, for instance, a fluid-pressure turbine is started without load because of the fact that, at this stage, the friction pinion 15 is the only element of the system which is in driving connection with said turbine. After the turbine has been brought to full speed, which because of the above conditions, may be done in a minimum of time, the valve 47 is gradually opened whereby pressure is gradually and concurrently admitted to the cylinders 22 and 23. This causes the rams of said cylinders to actuate the equalizing levers 26 and 27 and thereby force the friction wheels 16 and 17 against the pinion 15 under a gradually increasing pressure until the maximum pressure is reached. In this way the friction wheels 16 and 17 and with them the friction pinions 30 and 31 are finally coupled to the turbine. If the valve 48 is now opened pressure will similarly be admitted to the cylinders 37 and 38 whereby the equalizing levers 41 and 42 are actuated to force the pinions 30 and 31 against the friction wheel 32 under a gradually increasing pressure until the coupling 34 and the element connected therewith and to be driven is efficiently coupled to the turbine or other driving medium.

It is thus practicable to start the source of motive power without load, and by gradually throwing the friction rollers into contact, the shaft 33 may be brought up to full speed without shock and in a minimum of time.

In the form shown in Figs. 4 and 5, the double arrangement of friction wheels and friction pinions is replaced by a single arrangement of these elements. The coupling 10 is carried by a shaft 11 which in turn carries the fraction pinion 15; the latter is in engagement with a single friction wheel 16$^a$, corresponding to the wheel 16, and similarly located upon a shaft 18$^a$ which in turn carries a fraction pinion 30$^a$ corresponding to the pinion 30. The pinion 30$^a$ is in engagement with a friction wheel 32$^a$ similar to the wheel 32 and correspondingly mounted upon a shaft 33$^a$ which carries a coupling 34$^a$ similar to the coupling 34. The operation of this form of my invention is the same as the corresponding parts of the form first described.

The reversing arrangement shown in Fig. 6 may be included in both illustrated forms of my invention and comprises a friction roller 49 which under the action of the ram in a pressure cylinder 50 wedges itself between the pinion 30$^a$, which corresponds to the pinions 30 and 31, and the friction wheel 32$^a$ which corresponds to the wheel 32. In this way the friction pinion 30$^a$ or its equivalent is forced out of contact with the wheel 32$^a$ or its equivalent by the roller 49 which, by engagement with said pinion 30$^a$ and the wheel 32$^a$ transmits motion from the pinion to the wheel and thus causes the latter to rotate in the same direction as the pinion; the direction of rotation of the wheel 32$^a$ is thus the reverse of what it is when driven directly by the pinion 30$^a$.

By controlling the pressure, which is admitted to the cylinder 50 through a pipe 51, the roller 49 may be brought into and out of action, as desired, it being understood that suitable springs 52 are provided for returning said roller to its normal position when the pressure is removed. With this arrangement it is possible to reverse the direction of rotation of the driven element without in any way interfering with the direction of rotation or other operation of the driving element such as a turbine.

A suitable cover 53 may be provided for enclosing the mechanism and may be removably secured to the frame 14 in any convenient manner as by means of bolts 54; as shown in Fig. 6, said cover may be perforated as indicated at 55 in order to permit the circulation of air about the mechanism whereby the temperature thereof is maintained at the desired normal level to prevent overheating.

The system is noiseless and efficient in operation and reduces the cost of manufacture, installation and upkeep to a minimum, while at the same time providing a maximum of efficiency for its intended purpose.

Various changes in the specific form shown and described may be made within the scope of the claims without departing from the spirit of my invention.

I claim:

1. In a rolling frictional transmission and speed conversion mechanism, a plurality of smooth, hard, metallic, cylindrical surfaces in rolling contact with each other, and means pressing said surfaces together, said means exerting forces exceeding 1200 pounds per lineal inch width of face in contact and extending up to the limit of the crushing resistance of the material.

2. In a rolling frictional transmission and speed conversion mechanism, a pair of friction wheels having smooth, hard, metallic, rolling contact surfaces, an intermediate friction wheel located between said pair of wheels, in diametric alignment therewith, and having a smooth, hard, metallic, rolling contact surface, means for applying fluid pressure to press said pair of friction wheels against said intermediate friction wheel and equalizing levers for distributing the pressure in predetermined proportions.

In testimony whereof I have hereunto set my hand.

HENRY HARRISON SUPLEE.